United States Patent [19]

Shaum et al.

[11] Patent Number: 4,603,579
[45] Date of Patent: Aug. 5, 1986

[54] TROLLING SPEED INDICATOR

[75] Inventors: Richard L. Shaum, Davison; Edward A. Burr, Grand Blanc, both of Mich.

[73] Assignee: Richard L. Schaum, Davison, Mich.

[21] Appl. No.: 646,645

[22] Filed: Aug. 31, 1984

[51] Int. Cl.$^4$ ............................................. G01P 5/04
[52] U.S. Cl. ...................................... 73/186; 116/62.1
[58] Field of Search ............... 73/184, 186; 116/62.1, 116/265, 275, 273

[56] References Cited

U.S. PATENT DOCUMENTS

| | | | |
|---|---|---|---|
| 2,617,297 | 11/1952 | Moore | 73/186 |
| 3,871,219 | 3/1975 | Quick | 116/62.1 |
| 4,295,367 | 10/1981 | Leslie | 73/184 |

Primary Examiner—Charles Frankfort
Assistant Examiner—Denis E. Corr

Attorney, Agent, or Firm—Gifford, Groh, VanOphem, Sheridan, Sprinkle & Dolgurkov

[57] ABSTRACT

A trolling speed indicator adapted to be mounted to the gunnel of a boat along either a vertical or horizontal surface. The indicator measures the speed of the boat during trolling so that a fisherman can utilize the optimum lure size and weight. The indicator generally comprises a L-shaped flange which is mounted to the boat gunnel, a pointer fixedly secured to the flange and indicating means rotatably secured to the flange. The indicating means comprises a velocity scale attached to an annular disk. A tubular rod is attached at its first end to the annular disk while the second end of the rod is submerged in the water and is influenced by the force of the water as the boat moves across the water. The mounting means permits simple removal of the device and a clip, which is also mounted to the gunnel, allows the tubular rod to be stored out of the water.

4 Claims, 3 Drawing Figures

TROLLING SPEED INDICATOR

FIELD OF THE INVENTION

This invention relates to a speed gauge and, in particular, to an indicator for accurately measuring the speed of a boat during trolling.

DESCRIPTION OF THE PRIOR ART

Fishing techniques vary depending upon conditions and available equipment. One of the more popular fishing techniques involves casting the bait or lure from a moving boat and dragging or trolling the lure. The depth at which the lure will travel is dependent upon lure weight and boat speed. Since certain fish can be found at particular water depths, it is important that the fisherman precisely control both lure weight and boat speed. Similarly, some fish are attracted by lures which travel at particular speeds again requiring the fisherman to accurately determine boat speed.

Many boats are equipped with mechanical speed gauges based upon a rack and pinion system. Typically, these devices are built directly into larger boats and translate the boat's speed directly to a gauge located in the boat's dashboard. However, because of their construction these mechanical devices add to the manufacturing costs of the boat. Moreover, the mechanical gauges are generally built into the hull of the boat making them expensive and difficult to install in a fully assembled boat.

Although larger boats may be built with speed gauges, a large majority of recreational fishing is done on smaller inland lakes from boats which are equipped only with a motor. These smaller fishing boats generally consist of an aluminum or fiberglass hull and are not capable of supporting intricate mechanical speed indicators. Moreover, the major attraction of these smaller boats is their simple construction and low cost. A speed gauge comprising the rack and pinion system would substantially increase the cost of these boats.

The common characteristic of the prior art speed gauges is that the velocity is translated to a pointer which pivots across an appropriate scale. Generally, these pointers are spring-biased in order to force the pointer back to a resting or zero location. Because of the sensitive structure of the pointer and the mechanics of the gauges these gauges can provide inaccurate readings or fail altogether.

SUMMARY OF THE PRESENT INVENTION

The present invention overcomes the disadvantages of the prior art by providing a trolling speed indicator which can be simply mounted to either a vertical or horizontal surface of a boat gunnel yet provides an accurate indication of the velocity of the boat.

The indicator according to the present invention comprises a velocity scale attached to an annular disk which is axially and rotatably mounted to one end of a flange member. The other end of the flange member is detachably mounted to the gunnel of the boat thus permitting simple removal of the device. A pointer is fixedly secured to the flange member at the axis of the annular disk to provide a fixed reference for the velocity scale. A tubular rod is attached at one end to the annular disk. The other end of the rod is submerged along side of the boat such that, as the boat moves across the water, the drag of the water causes the tubular rod to pivot causing the annular disk to rotate accordingly. A clip is separately mounted to the boat gunnel for retaining the tubular rod parallel to the gunnel in a stored position.

Other objects, features, and advantages of the invention will be apparent from the following detailed description taken in connection with the accompanying drawings.

BRIEF DESCRIPTION OF THE DRAWINGS

The present invention will be more fully understood by reference to the following detailed description of the preferred embodiment of the present invention when read in conjunction with the accompanying drawing, in which like reference characters refer to like parts throughout the views and in which.

DETAILED DESCRIPTION OF THE PREFERRED EMBODIMENT

Figure 1:
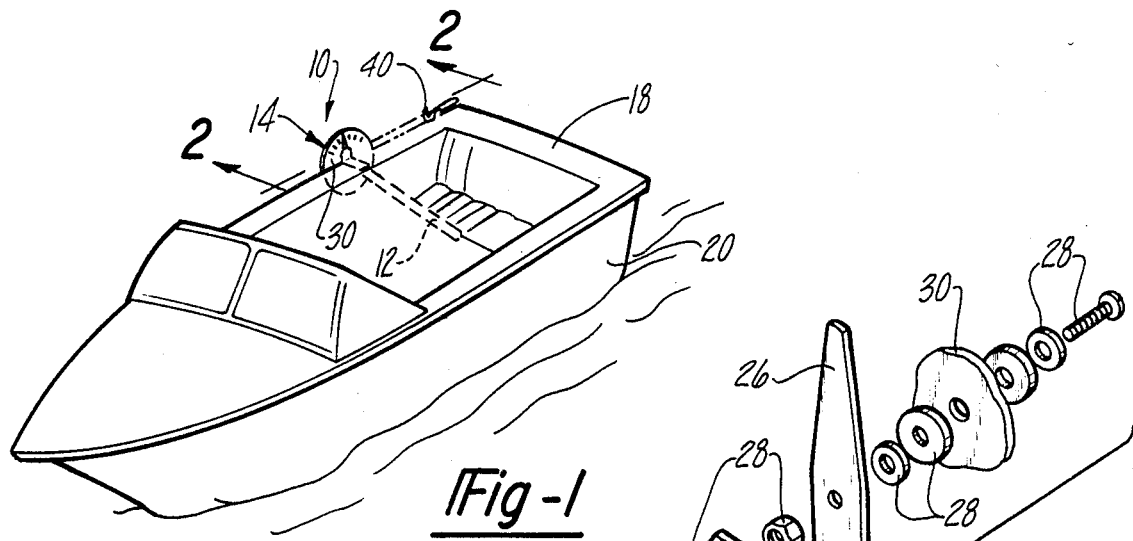
FIG. 1 is an elevated perspective of the preferred embodiment of the present invention mounted to the gunnel of a motor boat.
Figure 3:
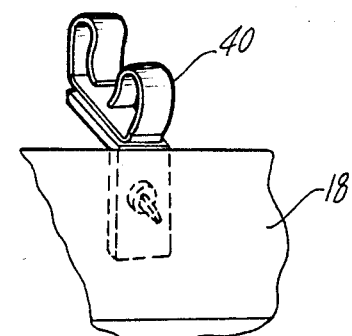
FIG. 3 is an exploded perspective of the axial mounting arrangement of the present invention.
Figure 2:
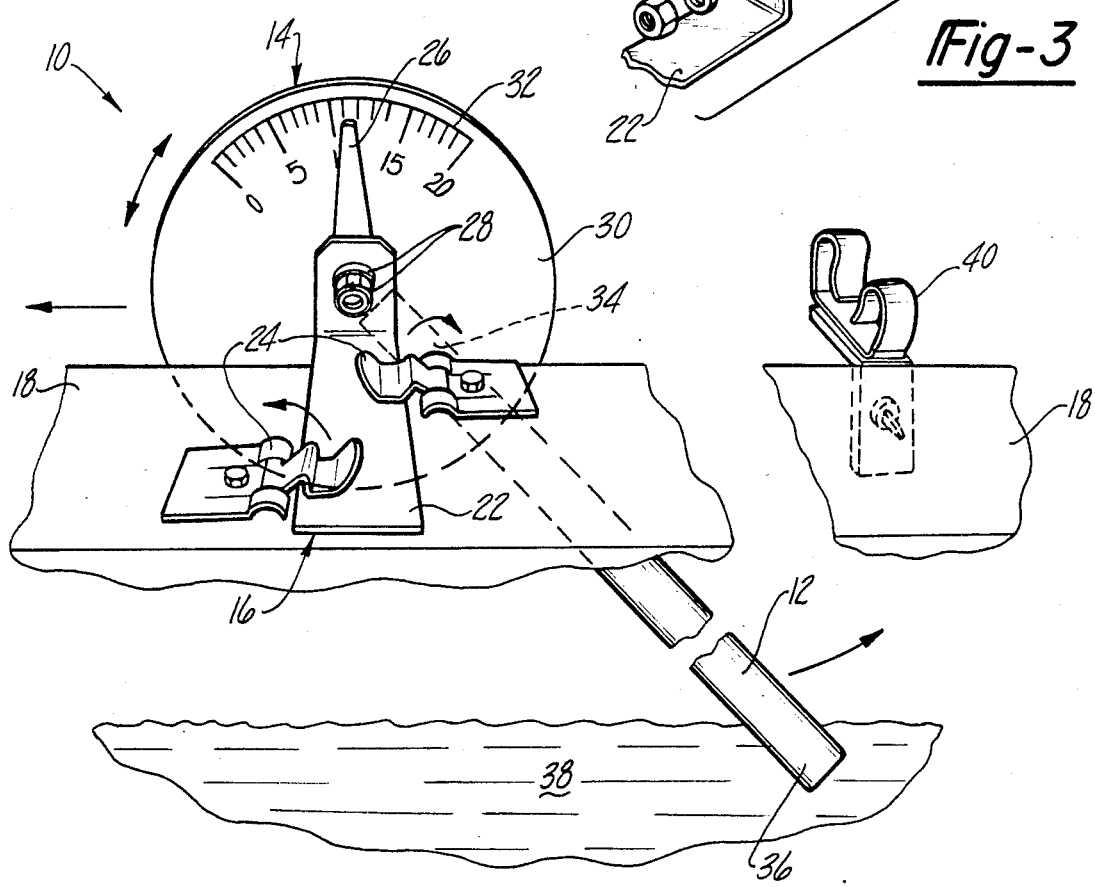
FIG. 2 is a front perspective of the preferred embodiment of the present invention.

Referring generally to FIGS. 1 through 3, there is shown a device 10 for indicating the speed of a watercraft and comprising generally an elongated rod 12, indicating means 14 and mounting means 16. The indicator 10 is adapted to be mounted to the gunnel 18 of a boat 20.

In the embodiment of the device 10 shown in FIG. 2, the mounting means 16 includes and L-shaped flange member 22 which permits the device 10 to be mounted to a horizontal surface of the boat gunnel 18. Alternatively, the flange member 22 could be flat to facilitate mounting the device 10 to a vertical surface. With either embodiment, one end of the flange member 22 is detachably mounted to the gunnel 18 by clips 24. Preferrably, the clips 24 are pivotal such that the device 10 can be easily removed from the gunnel 18 when not in use.

Referring now to FIGS. 2 and 3, the flange member 22 supports the indicating means 14 in a vertical position. A pointer 26 is first fixedly secured to the flange member 22 by the bolts, nuts and washers of mounting arrangement 28. In the preferred embodiment, the pointer 26 is fixed in a vertical position. However, the pointer 26 could be fixed at any angle depending upon the requirements of the device. Spaced apart from the pointer 26 and rotatably mounted to the flange member 22 is an annular disk 30. The disk 30 is axially mounted to the support flange 22 so that the disk 30 will rotate in either direction. Moreover, although the preferred embodiment of the present invention contemplates an annular disk 30, the disk 30 may, in the alternative, be any shape including a semi-circular disk. A calibrated scale 32 is attached to the disk and can be calibrated for a wide range of values as will be subsequently described.

Secured to the disk 30 is the elongated rod 12. The rod 12 is attached at a first end 34 to the back of the disk 30. A second end 36 of the rod 12 is placed in the water 38 and is affected by the force of the water as the boat 20 moves across the surface. Preferably, the rod 12 is tubular and can range from three to ten feet in length depending upon the conditions under which the device 10 is used. Finally, a clip 40, which is also secured to the gunnel 18, is provided for retaining the second end 36 of the rod 12. Although the device 10 can be easily dismounted from the boat gunnel 18, the clip 40 can be utilized to retain the rod 12 in a stored position (FIG. 1).

In use, the device 10 is mounted to either a horizontal or vertical surface of a boat gunnel 18 so that the indicating means 14 and the tubular rod 12 extend out over the water 38. While heading to the desired fishing location, the rod 12 is preferably stored in the clip 40. Once the destination is reached, the rod 12 is removed from the clip 40 and allowed to extend into the water 38. The weight of the rod 12 will cause it to assume a substantially vertical position giving a zero speed reading. As the speed of the boat 20 increases during trolling, the drag of the water 38 will cause the rod 12 to pivot and the annular disk 30 to rotate about its axis thereby indicating the speed of the boat 20 as it travels across the water.

The angular displacement of the rod 12 and disk 30 is dependent not only upon boat speed but also upon the length and weight of the rod 12. As the length of the rod 12 is increased the force of the water 12 upon the rod will also increase. Similarly, as the weight of the rod 12 is increased the gravitational pull and, therefore, the tendency of the rod 12 to assume a vertical position also increases. By varying the length and weight of the rod 12 the device 10 can be calibrated for varying conditions and requirements.

During storage of the boat 20, the device is easily dismounted from the gunnel 18 by either sliding the flange 22 from beneath the clips 24 or by first loosening the clips 24. Thus, the present invention provides a simple yet substantially precise means of indicating boat speed particularly useful during trolling operations which require that the fisherman have a good indication of the boat speed. Moreover, because of structure of the device 10, if the boat 20 passes through weeds or shallow waters, the pivoting action of the rod 12 prevents it from getting hung-up which could cause damage to the boat. Finally, the device may be constructed and calibrated for a wide range of conditions and requirements.

The foregoing detailed description has been given for clearness of understanding only and no unnecessary limitations should be understood therefrom as some modifications will be obvious to those skilled in the art.

I claim:

1. An indicator for determining the velocity of a nautical vessel, said indicator comprising:
    mounting means for detachably mounting said indicator to the gunnel of the nautical vessel, said mounting means comprising at least one clip secured to the gunnel of the vessel and including a portion biased against said gunnel;
    an elongated flange member having first and second ends wherein said first end is secured to said vessel by said biased portion of said clip of said mounting means;
    a pointer adjustably fixedly secured parallel to said second end of said flange member;
    indicating means rotatably secured to said second end of said flange member, said indicating means comprising a velocity scale disposed on an annular disk wherein said annular disk is axially and rotatably mounted to said second end of said flange member and wherein said annular disk is disposed parallel to and spaced apart from said fixed pointer, and said fixed pointer and said annular disk being mounted on a common shaft whereby calibration can be accomplished by adjusting the rotational relationship between the pointer and the disk; and
    an elongated submersible rod having a first end fixedly secured to said annular disk.

2. The indicator as defined in claim 1 and further comprising a clip mounted to said vessel for retaining the second end of said elongated rod.

3. The indicator as defined in claim 1 wherein said flange member is substantially L-shaped such that said second end is perpendicular to said first end.

4. The indicator as defined in claim 1 wherein said elongated rod is a tubular rod.

* * * * *